Patented Nov. 16, 1943

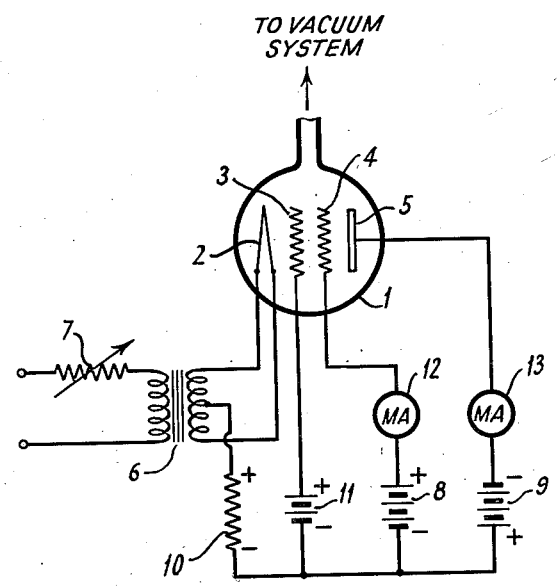
INVENTOR.
BERNARD SALZBERG
RICHARD B. NELSON

2,334,356

UNITED STATES PATENT OFFICE 2,334,356

VACUUM GAUGE

Bernard Salzberg, East Orange, N. J., and Richard B. Nelson, Ottawa, Ontario, Canada, assignors to Radio Corporation of America, a corporation of Delaware Application May 28, 1941, Serial No. 395,574

2 Claims. (Cl. 175—183)

Our invention relates to pressure measuring devices, particularly to devices such as ionization gauges for measuring very low gas pressures.

The pressure of rarified atmospheres is commonly measured by ionizing the gas in the atmosphere by electrons emitted from a cathode and by measuring the current flow produced by the ionized molecules. The accuracy of such measurements depends upon a predetermined and steady electron current since the ion current will vary with the electron current. Usually elaborate voltage control equipment is necessary to control the current through and temperature of the cathode which supplies the electrons.

An object of our invention is a low pressure gauge which is sensitive, inexpensive to construct and easy to operate.

A more specific object of our invention is an improved ionization gauge which is insensitive to cathode emission changes.

The characteristic features of our invention are defined in the appended claims and one preferred embodiment is described in the following specification and shown in the accompanying drawing.

The envelope 1 of our novel vacuum gauge communicates through a tube to the vacuum system, the gas pressure of which is to be measured. Within the envelope is the cathode 2 which may be of the directly heated type, as shown, or of the indirectly heated type. Adjacent the cathode is mounted a control grid 3, and outward from the control grid is mounted a foraminous grid-anode 4, and beyond the grid-anode is mounted the ion collector 5. The several electrodes may be of the planar type and aligned as represented in the drawing, or the electrodes may be tubular, telescoped one within the other and mounted in an envelope in the manner commonly used in the manufacture of conventional radio receiving tubes.

If alternating current is employed to heat the cathode, it may conveniently be applied through transformer 6 to the cathode terminals. The variable resistor 7 is provided for adjusting the cathode temperature. The grid-anode 4 and ion collector 5 are connected through voltage sources 8 and 9, respectively, to one end of biasing resistor 10, the other end of the resistor being connected to the cathode, preferably to the center tap of the cathode transformer secondary. Voltage sources 8 and 9, diagrammatically represented in the drawing as batteries, are so polarized as to impress upon the grid-anode 4 a high positive potential and upon the ion collector 5 a high negative potential, with respect to the cathode. The control grid 3 may be operated at a potential near zero or slightly positive with respect to the cathode by biasing battery 11. The milliammeter 12 in circuit with the grid-anode 4 measures the electron current while meter 13 in circuit with the ion collector 5 measures ion current. If desired the wires or openings of the two electrodes 3 and 4 may be aligned so that electrons starting at the cathode will pass through the two grid electrodes toward the ion collector without immediately striking either electrode. With certain electrode potentials, most of the electrons may be caused to flow through and oscillate within the openings of the grid-anode 4 before they are finally absorbed by the grid-anode 4.

According to one of the characteristic features of our invention, our ionization gauge contains two grid-like electrodes 3 and 4 between the cathode 2 and the ion collector 5, which is to be distinguished from the usual ionization gauge having only one grid-like electrode. In our gauge, the electron current from the cathode may be space charge limited and held more nearly constant than can be done with only one grid and is hence much less sensitive to cathode temperature variations. In the conventional "triode" gauge where the cathode is exposed to a highly positive grid, the emission can necessarily only be temperature limited. Our novel ionization gauge is made even more insensitive to variations in cathode line voltages and temperatures by the introduction of resistance in the cathode circuit. The value of this resistance indicated at 10 is so chosen that the voltage drop thereacross is sufficient to control the potential of the control grid 3 in response to current changes in the circuit of the grid-anode 4.

The resistance 10 is adjusted to such a value that the current flowing in the circuit of grid-anode 4 sets up a biasing potential for the control grid across the terminals of the resistor. For large values of current in the circuit of the grid-anode 4, voltage drop across the resistor 10 automatically tends to become greater and the electron current to the grid-anode 4 therefore tends to decrease. There is a corresponding lowering of potential at control grid 3. This automatic variation of biasing potential for the control grid and positive potential on grid-anode 4 tends to maintain the reading of current meter 12 at a relatively constant value. Hence the usual complicated voltage regulators for the cathode used in ionization gauges may be eliminated and the simple variable resistance 7 substituted. With constant electron current between the cathode and grid-anode 4, the amount of gas ionized and the current indicated by meter 13 will be directly proportional to the gas pressure in the envelope.

Our improved gauge, further, is more sensitive at any particular pressure than the conventional gauge. Electrons oscillate through the openings of the positive grid-anode 4 between the negative fields of the cathode on the one side and the ion collector 5 on the other. The increased length of travel of the electrons before they are absorbed by the grid-anode, materially increases their probability of collision with gas molecules. Hence, for any given pressure more gas will be ionized for each unit of electron current.

Good results have been obtained in using a standard radio tube of the type commercially known as the RCA–828 in our novel gauge. The suppressor grid of this particular tube was connected to the plate and by applying about 150 volts to the grid-anode 4 and about 22½ volts negative to the ion collector 5, and about 10 volts positive to the control grid 3, the tube when connected to a vacuum system showed about 50% more sensitiveness than the standard three-element ionization gauge at pressures below $10^{-3}$ mm. of mercury. No variations in ion current were noted with the usual line voltage and cathode temperature variations.

Our improved gauge does not require complicated cathode temperature regulators, is sensitive at low pressures and is easy to construct and operate.

We claim:

1. A vacuum gauge comprising an envelope, a cathode in said envelope, a grid-anode spaced from said cathode, a resistor and a voltage source connected in series between said cathode and said grid-anode, said voltage source being polarized to apply a positive potential to said grid-anode, a control grid between said cathode and said grid-anode, said control grid being connected to said resistor whereby the voltage drop of said resistor will bias said control grid with respect to said cathode, and means for measuring ions in said envelope.

2. A vacuum gauge comprising an envelope communicating with the vacuum system to be tested, a cathode in said envelope, a resistor, a control grid in said envelope, said control grid being connected to said cathode through said resistor, a grid-anode, a voltage source, said resistor and said voltage source being connected in series between said grid-anode and said cathode, and an ion collecting electrode in said envelope, a voltage source, said ion collecting electrode being connected to the negative terminal of said voltage source, the other end of said voltage source being connected to said cathode, and a current meter in the ion collecting electrode circuit.

BERNARD SALZBERG.
RICHARD B. NELSON.